(12) United States Patent
Lee et al.

(10) Patent No.: US 12,343,891 B2
(45) Date of Patent: Jul. 1, 2025

(54) FILM CUTTING DEVICE, FILM CUTTING METHOD USING THE SAME, AND DISPLAY DEVICE INCLUDING CIRCUIT FILM CUT BY THE SAME

(71) Applicant: Samsung Display Co., Ltd., Yongin-Si (KR)

(72) Inventors: Chung-Seok Lee, Hwaseong-si (KR); Jeongeun Park, Goyang-si (KR); Hanho Park, Yongin-si (KR); Jeongmin Ban, Cheonan-si (KR); Joongmok Lee, Suwon-si (KR); Soyeon Joo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 40 days.

(21) Appl. No.: 17/402,872

(22) Filed: Aug. 16, 2021

(65) Prior Publication Data
US 2022/0118637 A1    Apr. 21, 2022

(30) Foreign Application Priority Data

Oct. 16, 2020  (KR) .................. 10-2020-0134671

(51) Int. Cl.
  *B26D 1/04* (2006.01)
  *B26D 7/08* (2006.01)
  *B26D 7/10* (2006.01)
  *G06F 1/18* (2006.01)

(52) U.S. Cl.
  CPC ............ *B26D 1/045* (2013.01); *B26D 7/086* (2013.01); *B26D 7/10* (2013.01); *G06F 1/189* (2013.01)

(58) Field of Classification Search
  CPC . B26D 1/01; B26D 1/04; B26D 1/045; B26D 7/08; B26D 7/086; B26D 7/10
  USPC .......................................................... 83/160
  See application file for complete search history.

(56) References Cited

U.S. PATENT DOCUMENTS

| | | | | |
|---|---|---|---|---|
| 5,573,170 | A  * | 11/1996 | Sasaki .................... | H01L 24/11 228/41 |
| 5,768,970 | A  * | 6/1998 | Wolf ...................... | A21C 11/10 83/956 |
| 6,058,823 | A  * | 5/2000 | Michoud .............. | B26D 1/0006 83/508.3 |
| 6,250,188 | B1 * | 6/2001 | Sato ....................... | B26D 7/086 83/13 |
| 6,277,244 | B1 * | 8/2001 | Meschenmoser ......... | D21F 1/56 162/193 |
| 7,060,367 | B2 * | 6/2006 | Yamada ................. | B26B 21/60 428/587 |

(Continued)

FOREIGN PATENT DOCUMENTS

| | | |
|---|---|---|
| CN | 104755236 A | 7/2015 |
| CN | 109571604 A | 4/2019 |

(Continued)

*Primary Examiner* — Adam J Eiseman
*Assistant Examiner* — Richard D Crosby, Jr.
(74) *Attorney, Agent, or Firm* — CANTOR COLBURN LLP

(57) ABSTRACT

A film cutting device includes a stage which supports a circuit film, a cutter disposed on the stage to cut the circuit film, a vibration horn connected to the cutter, where the vibration horn vibrates the cutter in a first direction based on an ultrasonic wave, and a cooler which cools the cutter.

9 Claims, 8 Drawing Sheets

(56) References Cited

U.S. PATENT DOCUMENTS

| | | | | |
|---|---|---|---|---|
| 8,808,607 B2* | 8/2014 | Usui | B29C 48/288 | |
| | | | 264/494 | |
| 2003/0150306 A1* | 8/2003 | Sala | B26D 1/18 | |
| | | | 83/171 | |
| 2006/0249553 A1* | 11/2006 | Ukrainczyk | C03B 33/033 | |
| | | | 225/2 | |
| 2006/0260451 A1* | 11/2006 | Capodieci | B26D 1/00 | |
| | | | 83/932 | |
| 2007/0039435 A1* | 2/2007 | Kokubo | G01N 1/06 | |
| | | | 83/13 | |
| 2010/0193980 A1* | 8/2010 | Ghosh | B23Q 11/1053 | |
| | | | 264/28 | |
| 2011/0126685 A1* | 6/2011 | Geiss | B26D 7/086 | |
| | | | 83/613 | |
| 2011/0232108 A1* | 9/2011 | Ochiai | C23C 30/005 | |
| | | | 30/345 | |
| 2012/0060379 A1* | 3/2012 | Culf | B23P 15/40 | |
| | | | 30/350 | |
| 2013/0000452 A1* | 1/2013 | Fang | B24B 53/001 | |
| | | | 83/14 | |
| 2013/0152757 A1* | 6/2013 | Nakai | B26D 3/085 | |
| | | | 83/601 | |
| 2014/0096400 A1* | 4/2014 | Babaev | B21D 53/60 | |
| | | | 30/169 | |
| 2015/0055077 A1 | 2/2015 | Yoon et al. | | |
| 2015/0239140 A1 | 8/2015 | Majestic et al. | | |
| 2015/0251944 A1* | 9/2015 | Brackley | B26D 7/32 | |
| | | | 83/76.8 | |
| 2015/0266198 A1* | 9/2015 | Huber | B26D 7/086 | |
| | | | 83/597 | |
| 2018/0159086 A1 | 6/2018 | Cho | | |

FOREIGN PATENT DOCUMENTS

| | | |
|---|---|---|
| JP | H01301096 A | 12/1989 |
| JP | H06114793 A | 4/1994 |
| JP | 2000141289 A | 5/2000 |
| KR | 1020120116999 A | 10/2012 |
| KR | 1020140006790 A | 1/2014 |
| KR | 1020150021402 A | 3/2015 |
| TW | 201947650 A | 12/2019 |

* cited by examiner

FILM CUTTING DEVICE, FILM CUTTING METHOD USING THE SAME, AND DISPLAY DEVICE INCLUDING CIRCUIT FILM CUT BY THE SAME

This application claims priority to Korean Patent Application No. 10-2020-0134671, filed on Oct. 16, 2020, and all the benefits accruing therefrom under 35 U.S.C. § 119, the content of which in its entirety is herein incorporated by reference.

BACKGROUND

1. Field

Embodiments relate to a film cutting device. More particularly, embodiments relate to a film cutting device, a film cutting method using the film cutting device, and a display device including a circuit film cut by the film cutting device.

2. Description of the Related Art

As information technology develops, the market for a display device, which is a connection medium between a user and information, is growing. Accordingly, such a display device such as a liquid crystal display ("LCD") device, an organic light emitting display ("OLED") device, an electrophoretic display ("EPD") device, a plasma display panel ("PDP"), etc. has been more widely used in various fields.

A display device may include a display panel including a plurality of pixels and a driver for providing electrical signals to the pixels. The driver may include a data driver for providing data signals to the pixels and/or a gate driver for providing gate signals to the pixels.

The display device may include a circuit film connected to the display panel, and the circuit film may include the driver. Such a circuit film may be a chip-on-film ("COF"), for example, and the driver may be mounted on the circuit film in the form of a chip.

SUMMARY

Embodiments provide a film cutting device and a film cutting method for preventing a circuit film from being damaged.

Embodiments provide a display device including the circuit film cut by the film cutting device without being damaged.

An embodiment of a film cutting device according to the invention includes a stage which supports a circuit film, a cutter disposed on the stage to cut the circuit film, a vibration horn connected to the cutter, where the vibration horn vibrates the cutter in a first direction based on an ultrasonic wave, and a cooler which cools the cutter.

In an embodiment, the cutter may include a body portion connected to the vibration horn and extending in the first direction and a blade portion connected to the body portion and including a first surface and a second surface forming an angle with the first surface.

In an embodiment, the first surface may extend in the first direction, and the angle may be in a range of about 20 degrees to about 30 degrees.

In an embodiment, the first surface may extend in a second direction different from the first direction, the second surface may extend in a third direction different from the first direction and the second direction, and the angle may be in a range of about 40 degrees to about 60 degrees.

In an embodiment, the second direction and the third direction may be symmetrical with respect to an imaginary line in the first direction.

In an embodiment, the cooler may include at least one selected from liquid nitrogen, liquid oxygen, liquid argon, liquid hydrogen, and liquid helium.

In an embodiment, a frequency of the ultrasonic wave may be in a range of about 20 kilohertz (kHz) to about 40 kHz.

In an embodiment, the stage may include a heater for heating the circuit film.

In an embodiment, the heater may overlap the cutter.

In an embodiment, a temperature of the heater may be less than 100 degrees Celsius.

In an embodiment, the film cutting device may further include a vibration generator which generates the ultrasonic wave.

In an embodiment, the film cutting device may further include a converter which converts a vibration direction of the ultrasonic wave generated by the vibration generator.

In an embodiment, the film cutting device may further include an amplifier connected to the vibration horn, where the amplifier increases an amplitude of the ultrasonic wave.

In an embodiment, the amplitude of the ultrasonic wave amplified by the amplifier may be in a range of about 5 micrometers (μm) to about 15 μm.

An embodiment of a film cutting method according to the invention includes disposing a circuit film on a stage of a film cutting device, generating an ultrasonic wave to vibrate a cutter of the film cutting device in a first direction, the cutter being disposed on the circuit film, cooling the cutter, and cutting the circuit film by descending the cutter which vibrates in the first direction.

In an embodiment, the film cutting method may further include heating the circuit film.

In an embodiment, the circuit film may include a base layer and a plurality of leads disposed on the base layer, and the circuit film may be cut by the cutter in a direction from the plurality of leads to the base layer.

An embodiment of a display device according to the invention includes a display panel including a plurality of pixels, each of which emits a light, and a pad portion including a plurality of pads connected to the plurality of pixels and a circuit film connected to the pad portion. In such an embodiment, the circuit film includes a base layer and a plurality of leads disposed on the base layer and respectively connected to the plurality of pads. In such an embodiment, a cut surface is defined in the base layer and the plurality of leads. In such an embodiment, a pitch between the plurality of leads is less than or equal to about 25 μm, and an angle formed by the cut surface and a lower surface of the base layer is in a range of about 64.5 degrees to about 68.2 degrees.

In an embodiment, the circuit film may further include a solder resist layer covering the plurality leads on the base layer and a driving chip disposed on the solder resist layer and electrically connected to the plurality of leads.

In embodiments of the film cutting device and the film cutting method according to the invention, the cutter may vibrate in a vertical direction based on the ultrasonic wave, and the cooler may cool the cutter, so that the circuit film may be cut without damaging the circuit film. In such embodiments, heat generated in the cutter in the process of cutting the circuit film may decrease by the cooler, so that the lifespan of the cutter may increase.

In such embodiments, the cut surface that forms an angle in a predetermined range with the lower surface of the base layer may be defined in the circuit film of the display device according to the embodiments, so that damage of the circuit film such as bending of the leads, short-circuit failure between the leads, or the like may be effectively prevented.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
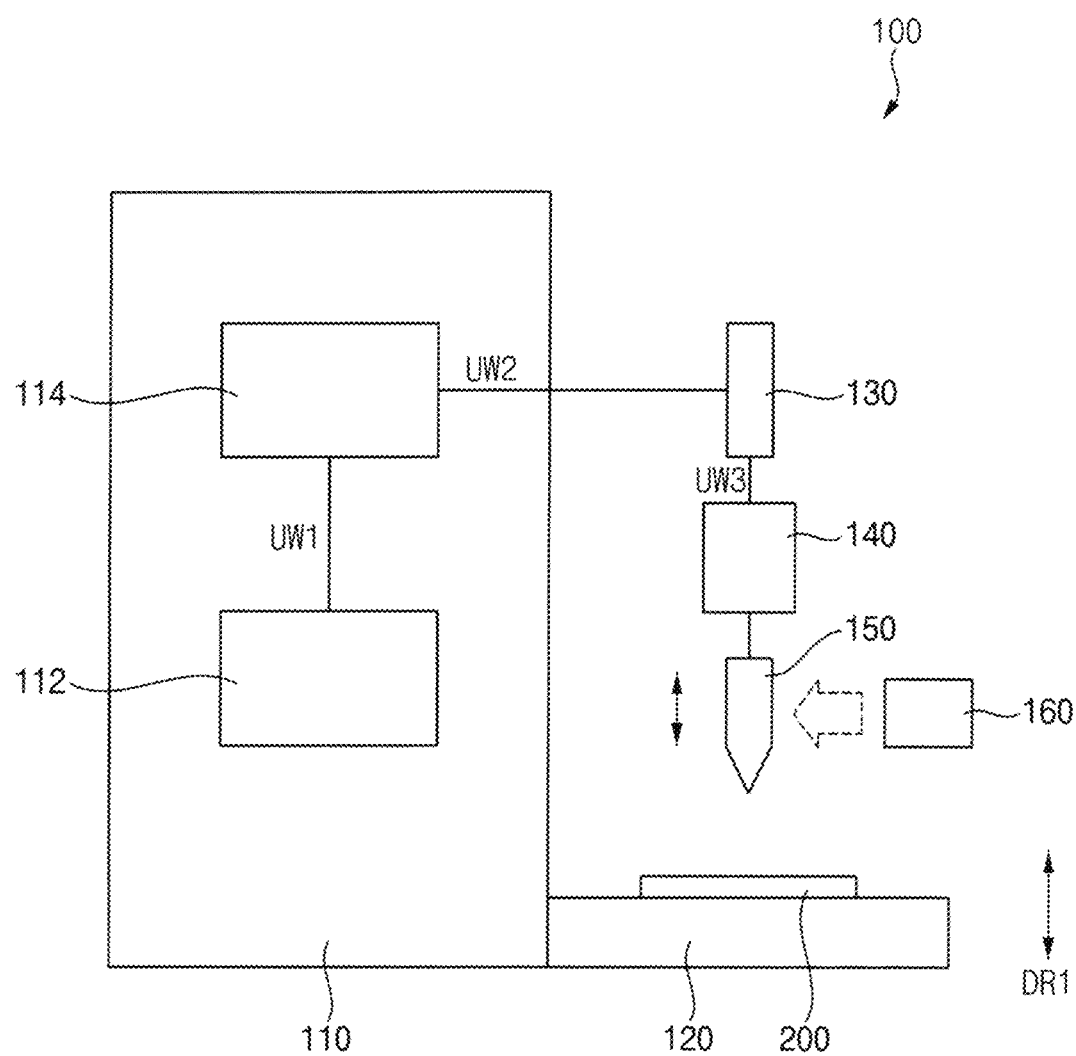
FIG. 1 is a diagram illustrating a film cutting device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a film cutting device, a film cutting method, and a display device in accordance with the invention will be described in detail with reference to the accompanying drawings.

Hereinafter, an embodiment of a film cutting device will be described in detail with reference to FIGS. 1 to 5.

Figure 2:
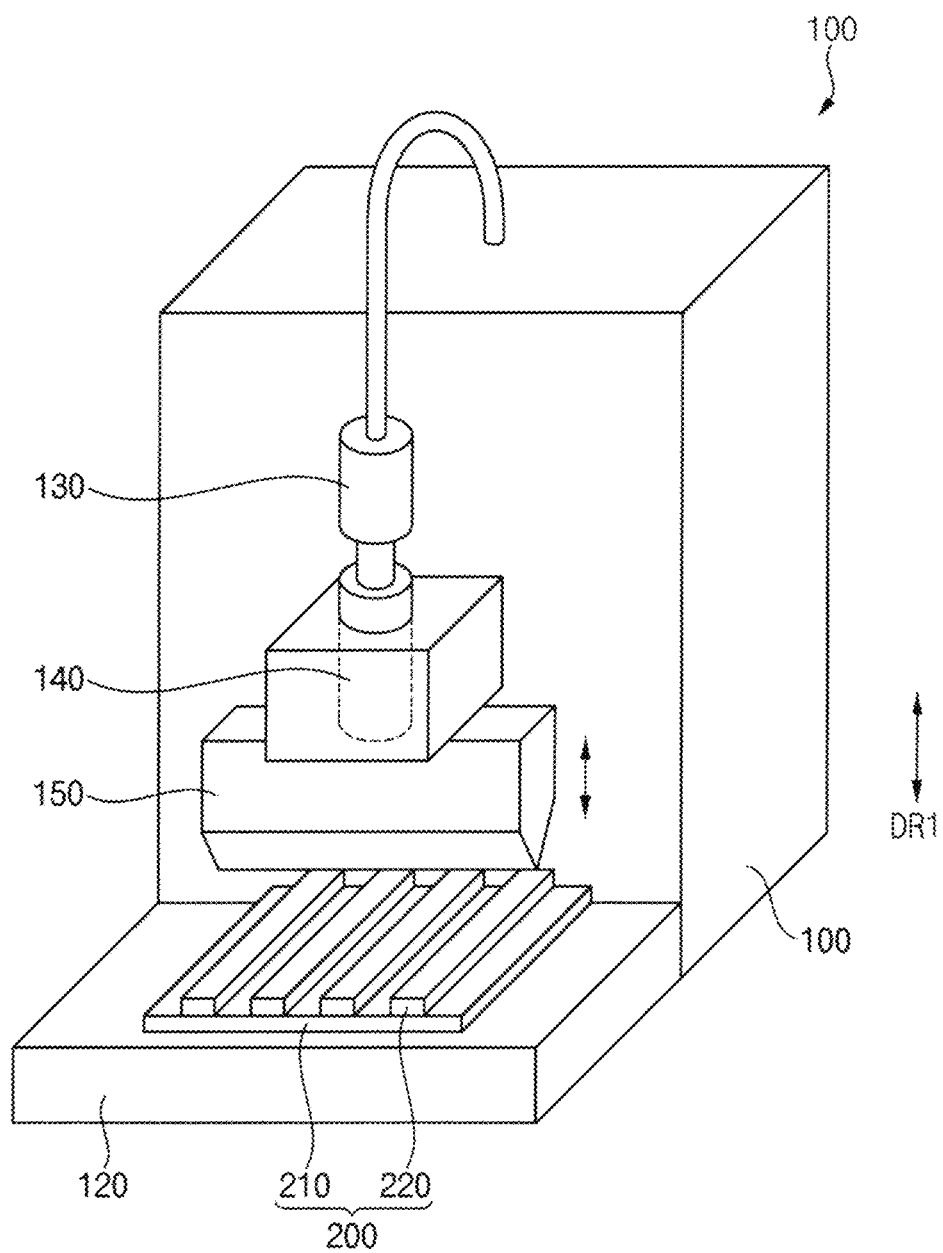
FIG. 2 is a perspective view illustrating the film cutting device in FIG. 1.
Figure 3:
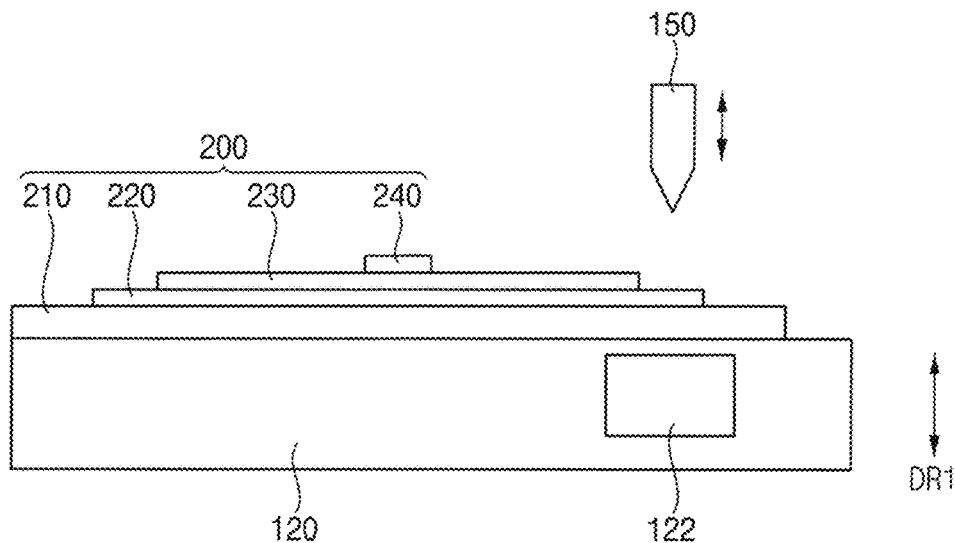
FIG. 3 is a cross-sectional view illustrating a portion of the film cutting device in FIG. 2.

FIG. 1 is a diagram illustrating a film cutting device according to an embodiment. FIG. 2 is a perspective view illustrating the film cutting device in FIG. 1. FIG. 3 is a cross-sectional view illustrating a portion of the film cutting device in FIG. 2.

Referring to FIGS. 1, 2, and 3, an embodiment of a film cutting device 100 may include a housing 110, a stage 120, an amplifier 130, a vibration horn 140, a cutter 150, and a cooler 160.

The housing 110 may include a vibration generator 112 and a converter 114. The housing 110 may provide a space in which the vibration generator 112, the converter 114, or the like may be disposed.

The vibration generator 112 may generate ultrasonic wave (or vibration) UW1. The ultrasonic wave UW1 generated by the vibration generator 112 may be alternating current ("AC"). Herein, AC may mean a transverse wave or a wave vibrating in a horizontal direction. The vibration generator 112 may transmit the ultrasonic wave UW1 to the converter 114.

In an embodiment, a frequency of the ultrasonic wave UW1 may be in a range of about 20 kilohertz (kHz) to about 40 kHz. In one embodiment, for example, the frequency of the ultrasonic wave UW1 may be about 30 kHz.

The converter 114 may convert a vibration direction of the ultrasonic wave UW1 generated by the vibration generator 112, e.g., from AC wave to direct current ("DC"). Herein, DC may mean a longitudinal wave or a wave vibrating in a vertical direction. Accordingly, the ultrasonic wave UW2 converted by the converter 114 may be DC. The converter 114 may transmit the ultrasonic wave UW2 to the amplifier 130.

The stage 120 may be positioned adjacent to the housing 110. The stage 120 may support a circuit film 200. The circuit film 200 may be disposed on the stage 120.

In an embodiment, the circuit film 200 may be a chip-on-film ("COF"). In such an embodiment, as shown in FIG. 3, the circuit film 200 may include a base layer 210, a plurality of leads 220, a solder resist layer 230, and a driving chip 240. The leads 220 may be disposed on the base layer 210, and the solder resist layer 230 may cover the leads 220 on the base layer 210. The driving chip 240 may be disposed on the solder resist layer 230, and may be electrically connected to the leads 220.

In an embodiment, the circuit film 200 may be disposed on the stage 120 in a way such that the base layer 210 contacts an upper surface of the stage 120. In such an embodiment, the base layer 210, the leads 220, the solder resist layer 230, and the driving chip 240 of the circuit film 200 may be disposed on the stage 120 in the above order.

The amplifier 130 may increase an amplitude of the ultrasonic wave UW2 converted to DC. In an embodiment, the amplitude of the ultrasonic wave UW3 amplified by the amplifier 130 may be about 5 micrometers (μm) to about 15 μm. In one embodiment, for example, the amplitude of the ultrasonic wave UW3 may be about 10 μm. The amplifier 130 may transmit the ultrasonic wave UW3 to the vibration horn 140.

The vibration horn 140 may be connected to the amplifier 130. The vibration horn 140 may vibrate the cutter 150 in a first direction DR1 based on the ultrasonic wave UW3. In an embodiment, the first direction DR1 may be a vertical direction or a thickness direction of the circuit film 200 on the stage 120.

The cutter 150 may be connected to the vibration horn 140. The cutter 150 may vibrate in the first direction DR1 by the vibration horn 140. The cutter 150 may be disposed on the stage 120 that supports the circuit film 200. The cutter 150 may descend downwardly to cut the circuit film 200 while vibrating in the first direction DR1.

When the cutter 150 cuts the circuit film 200 while vibrating in the first direction DR1, the circuit film 200 may not be elastically deformed in the process of cutting the circuit film 200. Accordingly, in the process of cutting the circuit film 200, the cutter 150 may not smear the circuit film 200 or the leads 220 of the circuit film 200 may not torn by adhering to the cutter 150.

Figure 4:
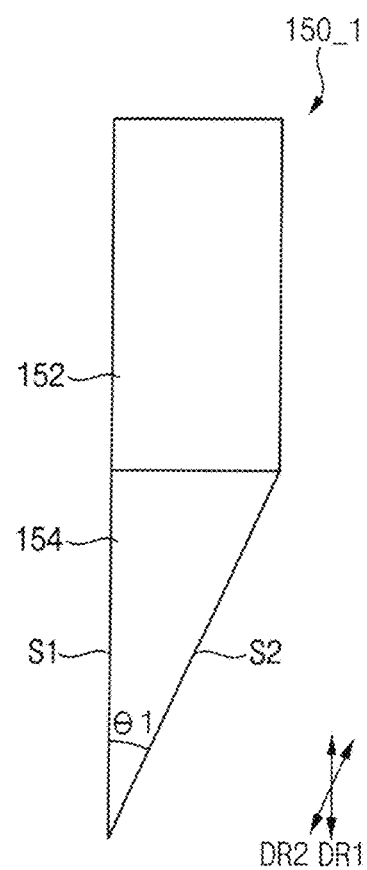
FIGS. 4 and 5 are cross-sectional views illustrating a cutter in FIG. 3.
Figure 5:
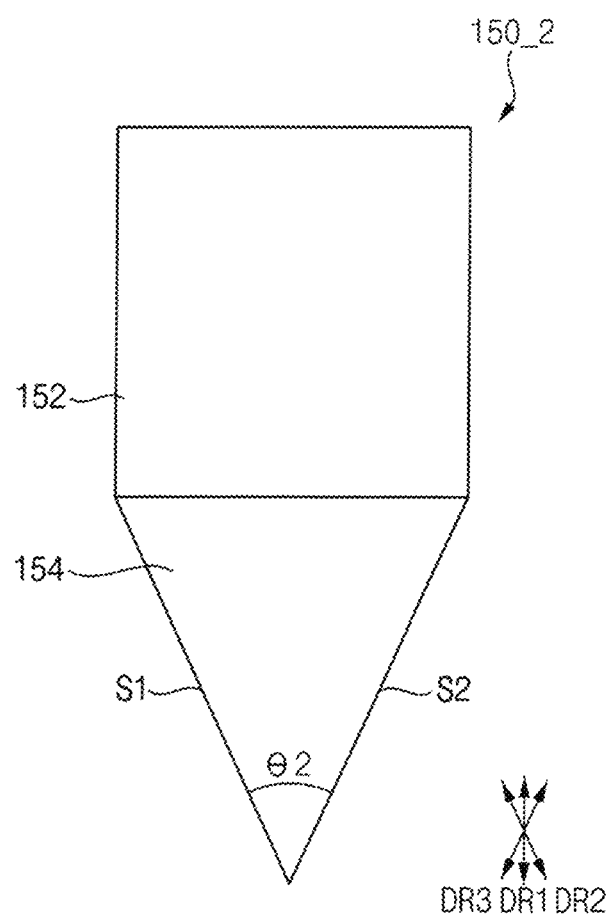

FIGS. 4 and 5 are cross-sectional views illustrating the cutter 150 in FIG. 3. Particularly, FIG. 4 may illustrate a cutter 150_1 according to an embodiment, and FIG. 5 may illustrate a cutter 150_2 according to an alternative embodiment.

Referring to FIGS. 3, 4, and 5, an embodiment of the cutter 150 may include a body portion 152 and a blade portion 154. The body portion 152 may be connected to the vibration horn 140. The body portion 152 may extend from the vibration horn 140 in the first direction DR1.

The blade portion 154 may be connected to the body portion 152. When the cutter 150 descends, the blade portion 154 may contact the circuit film 200, and the circuit film 200 may be cut by the blade portion 154. The blade portion 154 may include a first surface S1 and a second surface S2 that contacts the first surface S1 and forms a predetermined angle with the first surface S1.

In an embodiment, as illustrated in FIG. 4, the first surface S1 may extend in the first direction DR1, and the second surface S2 may extend in a second direction DR2 different from the first direction DR1. In such an embodiment, the second surface S2 may define a blade of the blade portion 154, and accordingly, the cutter 150_1 may have a single-bladed structure.

The angle θ1 formed between the first surface S1 and the second surface S2 may be in a range of about 20 degrees to about 30 degrees. In one embodiment, for example, the angle θ1 formed between the first surface S1 and the second surface S2 may be about 25 degrees.

In an alternative embodiment, as illustrated in FIG. 5, the first surface S1 may extend in a second direction DR2 different from the first direction DR1, and the second surface S2 may extend in a third direction DR3 different from the first direction DR1 and the second direction DR2. In an embodiment, the second direction DR2 and the third direction DR3 may be symmetrical with respect to an imaginary line in the first direction DR1. In such an embodiment, each of the first surface S1 and the second surface S2 may define a blade of the blade portion 154, and accordingly, the cutter 150_2 may have a double-bladed structure.

The angle θ2 formed between the first surface S1 and the second surface S2 may be in a range of about 40 degrees to about 60 degrees. In one embodiment, for example, the angle θ2 formed between the first surface S1 and the second surface S2 may be about 50 degrees. In such an embodiment, each of an angle formed between the first surface S1 and the first direction DR1 and an angle formed between the second surface S2 and the first direction DR1 may be in a range of about 20 degrees to about 30 degrees. In one embodiment, for example, each of an angle formed between the first surface S1 and the first direction DR1 and an angle formed between the second surface S2 and the first direction DR1 may be about 25 degrees.

Referring back to FIGS. 1 to 3, the cooler 160 may cool the cutter 150. The cooler 160 may be disposed adjacent to the cutter 150 to provide a cooling medium (e.g., cooled air) to the cutter 150. The cooler 160 may include at least one coolant supplier e.g., a cooling air supplier.

The cooler 160 may include a refrigerant for providing the cooled air. In an embodiment, the refrigerant may include at least one selected from liquid nitrogen ($LN_2$), liquid oxygen ($LO_x$), liquid argon (LAr), liquid hydrogen ($LH_2$), and liquid helium (LHe).

As the cooler 160 cools the cutter 150, heat generated while the cutter 150 cuts the circuit film 200 may decrease. Accordingly, abrasion of the cutter 150 may decrease, and the number of cuts of the cutter 150 may increase. In such an embodiment, since the refrigerant included in the cooler 160 may be vaporized into the atmosphere so that no residue may be generated, and the refrigerant may be harmless to the human body. In such an embodiment, since the cooler 160 is disposed adjacent to the cutter 150 to provide the cooled air to the cutter 150 and does not directly cool the circuit film 200 to be cut, the increase in strength and/or hardness of the circuit film 200 due to cooling the circuit film 200, shape deformation due to shrinkage of the circuit film 200, or the like may not occur.

The stage 120 may include a heater 122. The heater 122 may heat the circuit film 200.

In an embodiment, the heater 122 may overlap the cutter 150. Accordingly, the heater 122 may overlap a cut portion of the circuit film 200 that is cut by the cutter 150, and may heat the cut portion of the circuit film 200.

In an embodiment, as described above, the cooler 160 may not directly cool the circuit film 200 to be cut, but the circuit film 200 may be indirectly cooled while the cutter 150 cooled by the cooler 160 contacts the circuit film 200. However, since the heater 122 heats the cut portion of the circuit film 200, cooling the circuit film 200 may be effectively prevented, and accordingly, the increase in strength and/or hardness of the circuit film 200 due to cooling the circuit film 200, shape deformation due to shrinkage of the circuit film 200, or the like may be effectively prevented.

In an embodiment, a temperature of the heater 122 may be about 100 degrees Celsius or less. If the temperature of the heater 122 is greater than about 100 degrees Celsius, strength of the circuit film 200 may decrease, and accordingly, the circuit film 200 may not be easily cut by the cutter 150.

Hereinafter, an embodiment of a film cutting method according to the invention will be described in detail with reference to FIGS. 1 to 3.

Referring to FIGS. 1 to 3, in an embodiment of a film cutting method, the circuit film 200 may be disposed on the stage 120. The circuit film 200 may be disposed in a way such that the base layer 210 contacts the upper surface of the stage 120 and the leads 220 face the cutter 150.

Then, the ultrasonic wave UW1 may be generated to vibrate the cutter 150 in the first direction DR1. The ultrasonic wave UW1 having a frequency in a range of about 20 kHz to about 40 kHz may be generated from the vibration generator 112, and the ultrasonic wave UW1 may be converted from AC to DC by the converter 114. The amplitude of the ultrasonic wave UW2 converted to DC may be increased by the amplifier 130, and the vibration horn 140 may vibrate the cutter 150 in the first direction DR1 based on the amplified ultrasonic wave UW3.

Then, the cutter 150 may be cooled to decrease heat generated when the circuit film 200 is cut. The cooler 160 may cool the cutter 150 by providing cooled air to the cutter 150.

Then, the circuit film 200 may be cut by descending the cutter 150 that vibrates in the first direction DR1. The circuit film 200 may be cut in a direction from the leads 220 to the base layer 210 by the cutter 150. In such an embodiment, the cutter 150 may cut the base layer 210 after cutting the leads 220.

In an embodiment, the circuit film 200 may be heated to prevent the temperature of the circuit film 200 from decreasing due to the cooled cutter 150. A temperature of the heater 122 included in the stage 120 may increase so that heat may be provided to the circuit film 200.

Hereinafter, embodiments of a circuit film and a display device including the circuit film according to the invention will be described in detail with reference to FIGS. 6 to 12.

Figure 6:
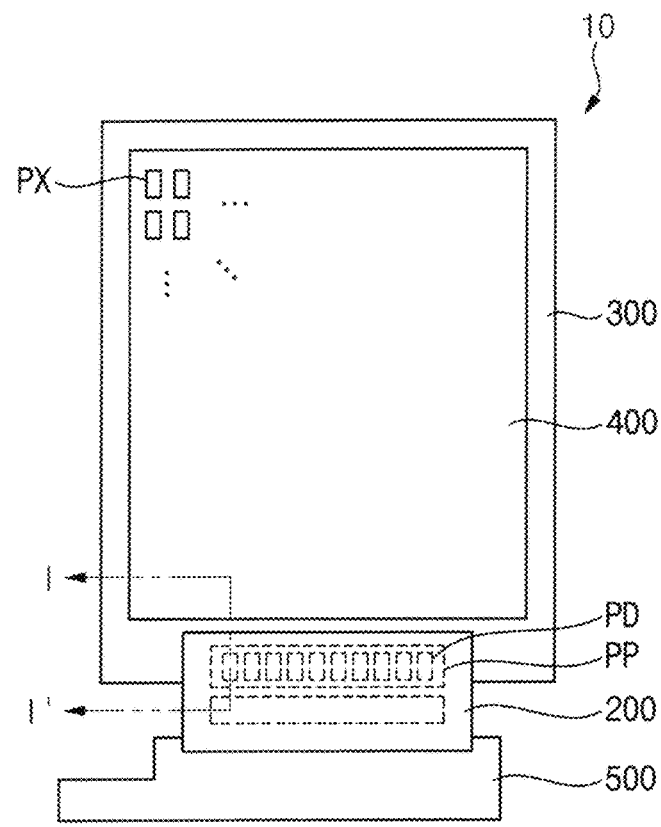
FIG. 6 is a plan view illustrating a display device according to an embodiment.
Figure 7:
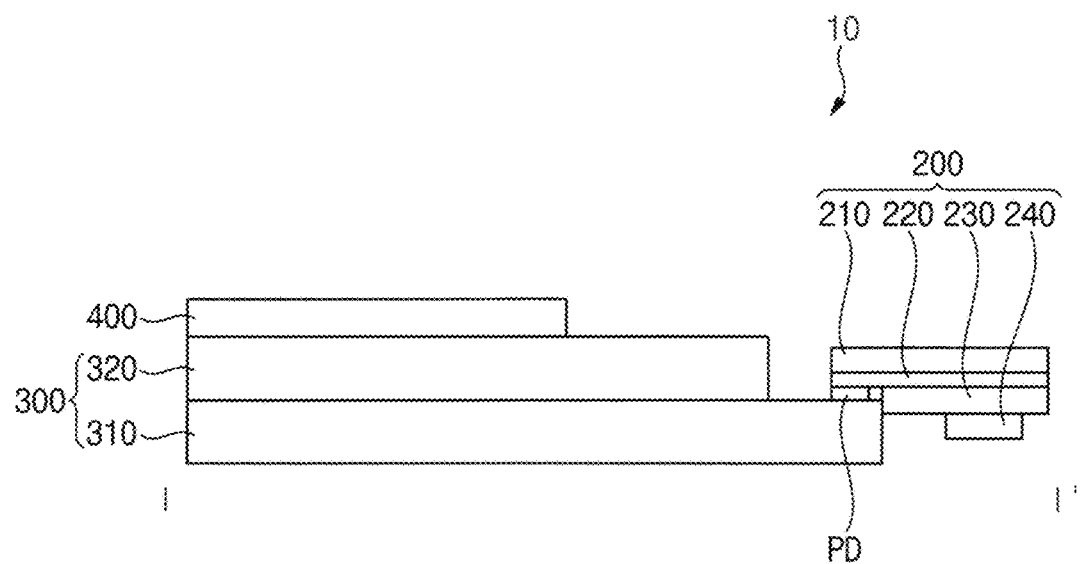
FIG. 7 is a cross-sectional view illustrating the display device taken along line I-I' in FIG. 6.

FIG. 6 is a plan view illustrating a display device according to an embodiment. FIG. 7 is a cross-sectional view illustrating the display device taken along line I-I' in FIG. 6.

Referring to FIGS. 6 and 7, an embodiment of a display device 10 may include a display panel 300, a polarization layer 400, a circuit film 200, and a printed circuit board 500.

The display panel 300 may include a plurality of pixels PX that emit light. The display panel 300 may display an image based on the light emitted from the pixels PX.

The display panel 300 may include a circuit element layer 310 and a light emitting element layer 320. The circuit element layer 310 may include a plurality of pixel circuits, a plurality of driving circuits, and a pad portion PP. The pad portion PP may include a plurality of pads PD. The pads PD may be electrically connected to the pixels PX. The light emitting element layer 320 may be disposed on the circuit element layer 310. The light emitting element layer 320 may include a plurality of light emitting elements respectively electrically connected to the pixel circuits. The pixel circuits may respectively provide electrical signals to the light emitting elements, and the light emitting elements may emit light based on the electrical signals. The pixel circuits and the light emitting elements may form or define the pixels PX.

In an embodiment, as shown in FIG. 7, the polarization layer 400 may be disposed on the display panel 300. The polarization layer 400 may reduce reflection of external light incident on the display panel 300. In one embodiment, for example, when external light passes through the polarization layer 400, and is reflected from below the polarization layer 400 (for example, the light emitting element layer 320), and then passes through the polarization layer 400 again, the phase of the external light may be changed as the external light passes through the polarization layer 400 twice. Accordingly, since the phase of the reflected light is different from the phase of the incident light entering the polarization layer 400, extinction interference may occur, and reflection of external light may be reduced, thereby improving visibility of the display device 10.

The circuit film 200 may be disposed on a side of the display panel 300. In one embodiment, for example, the circuit film 200 may be disposed on a side of the circuit element layer 310 of the display panel 300, and may be connected to the pad portion PP.

The circuit film 200 may include a plurality of leads 220 and a driving chip 240 electrically connected to the leads 220. Each of the leads 220 may be electrically connected to the pads PD. The driving chip 240 may transmit electrical signals to the circuit element layer 310 of the display panel 300 to drive the pixel circuits.

In an embodiment, the driving chip 240 may include a data driver. The data driver may generate data signals, and may transmit the data signals to the circuit element layer 310 of the display panel 300. In an alternative embodiment, the driving chip 240 may include a gate driver. The gate driver may generate gate signals, and may transmit the gate signals to the circuit element layer 310 of the display panel 300.

The printed circuit board 500 may be disposed on a side of the driving chip 240. The printed circuit board 500 may generate electrical signals, and may transmit the electrical signals to the circuit element layer 310 of the display panel 300. In an embodiment, the printed circuit board 500 may include a timing controller. The timing controller may generate image signals and control signals for driving the data driver and the gate driver, and may transmit the image signals and the control signals to the data driver and the gate driver.

Figure 8:
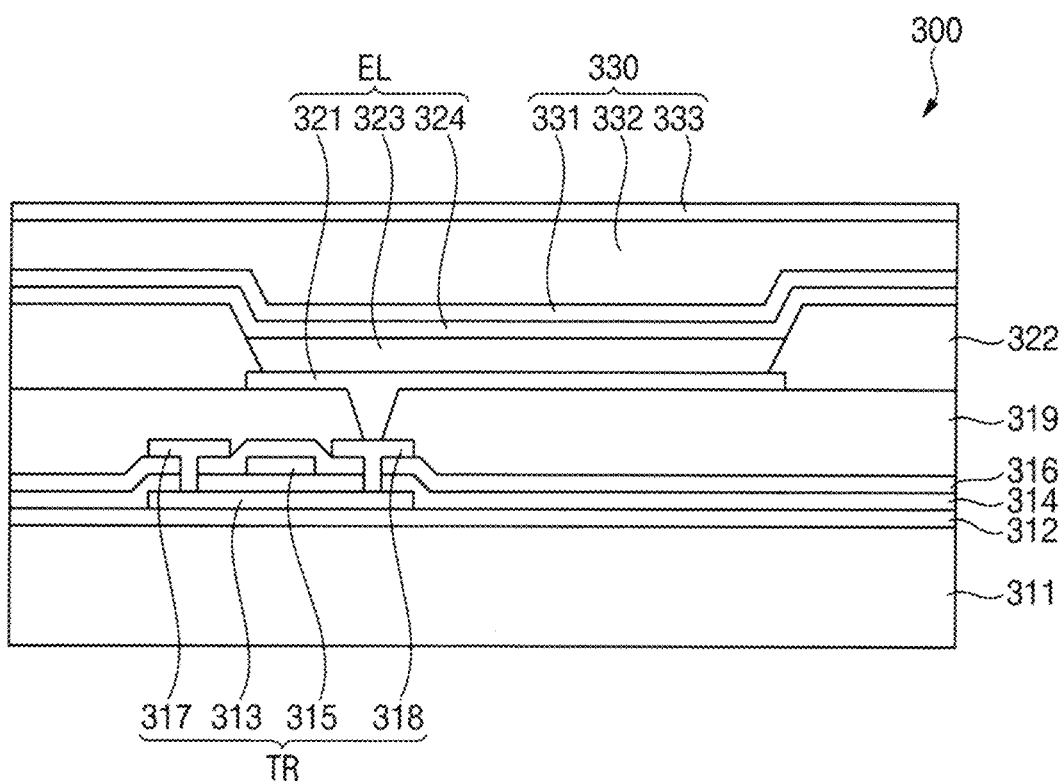
FIG. 8 is a cross-sectional view illustrating a display panel in FIG. 6.

FIG. 8 is a cross-sectional view illustrating the display panel 300 in FIG. 6.

Referring to FIG. 8, an embodiment of the display panel 300 may include a substrate 311, a transistor TR, a light emitting element EL, and a thin film encapsulation layer 330.

The substrate 311 may be a transparent or opaque insulating substrate. In an embodiment, the substrate 311 may have a flexible characteristic. In one embodiment, for example, the substrate 311 may include plastic such as polyimide, polycarbonate, polyethylene terephthalate, polyacrylate, or the like.

A buffer layer 312 may be disposed on the substrate 311. The buffer layer 312 may provide a planarized surface on the substrate 311, and may prevent impurities from flowing above the substrate 311 through the substrate 311.

An active pattern 313 may be disposed on the buffer layer 312. In an embodiment, the active pattern 313 may include amorphous silicon, polycrystalline silicon, or the like. In an alternative embodiment, the active pattern 313 may include an oxide semiconductor.

A gate insulation layer 314 is disposed on the buffer layer 312, and may cover the active pattern 313. The gate insulation layer 314 may include an inorganic insulation material such as silicon oxide, silicon nitride, silicon oxynitride, or the like.

A gate electrode 315 may be disposed on the gate insulation layer 314, and may overlap the active pattern 313. The gate electrode 315 may include a conductive material such as copper (Cu), molybdenum (Mo), titanium (Ti), aluminum (Al), or the like.

The insulation interlayer 316 may be disposed on the gate insulation layer 314, and may cover the gate electrode 315. The insulation interlayer 316 may include an inorganic insulation material such as silicon oxide, silicon nitride, silicon oxynitride, or the like.

A source electrode 317 and a drain electrode 318 may be disposed on the insulation interlayer 316, and may be connected to the active pattern 313. The source electrode 317 and the drain electrode 318 may include a conductive material such as copper (Cu), molybdenum (Mo), titanium (Ti), aluminum (Al), or the like. The active pattern 313, the gate electrode 315, the source electrode 317, and the drain electrode 318 may form or collectively define the transistor TR.

A planarization layer 319 may be disposed on the insulation interlayer 316, and may cover the source electrode 317 and the drain electrode 318. The planarization layer 319 may include an inorganic insulation material such as silicon oxide, silicon nitride, silicon oxynitride, etc. and/or an organic insulation material such as acrylic resin, epoxy resin, phenol resin, polyamide resin, polyimide resin, unsaturated polyester resin, polyphenylene-based resin, a polyphenylene sulfide-based resin, benzocyclobutene, etc.

The substrate 311, the buffer layer 312, the active pattern 313, the gate insulation layer 314, the gate electrode 315, the insulation interlayer 316, the source electrode 317, the drain electrode 318, and the planarization layer 319 may form or collectively define the circuit element layer 310 in FIG. 7.

A pixel electrode 321 may be disposed on the planarization layer 319, and may be connected to the drain electrode 318. The pixel electrode 321 may include a transparent conductive layer including at least one selected from indium-tin-oxide ("ITO"), indium-zinc-oxide ("IZO"), zinc oxide (ZnO), indium oxide ($In_2O_3$), etc., and a reflective conductive layer including silver (Ag), magnesium (Mg), aluminum (Al), platinum (Pt), lead (Pb), gold (Au), nickel (Ni), neodymium (Nd), iridium (Ir), chromium (Cr), lithium (Li) and calcium (Ca), for example. In an embodiment, the pixel electrode 321 may have a stacked structure of ITO/Ag/ITO. In such an embodiment, the pixel electrode 321 may be a reflective electrode.

A pixel defining layer 322 may be disposed on the planarization layer 319, and may cover at least a portion of the pixel electrode 321. In an embodiment, the pixel defining layer 322 may cover a peripheral portion of the pixel electrode 321, and a pixel opening is defined through the pixel defining layer 322 to expose a central portion of the pixel electrode 321. The pixel defining layer 322 may include an inorganic insulation material such as silicon oxide, silicon nitride, silicon oxynitride, etc. and/or an organic insulation material such as acrylic resin, epoxy resin, phenol resin, polyamide resin, polyimide resin, unsaturated polyester resin, polyphenylene-based resin, a polyphenylene sulfide-based resin, benzocyclobutene, etc.

An emission layer 323 may be disposed on a portion of the pixel electrode 321 exposed by the pixel opening and the pixel defining layer 322. Holes provided from the pixel electrode 321 and electrons provided from an opposite electrode 324 may be combined in the emission layer 323 to form excitons, and the excitons change from an excited state to a ground state so that the emission layer 323 may emit light.

The opposite electrode 324 may be disposed on the emission layer 323. The opposite electrode 324 may include a transparent conductive layer including at least one selected from lithium (Li), calcium (Ca), aluminum (Al), magnesium (Mg), silver (Ag), platinum (Pt), lead (Pb), nickel (Ni), gold (Au), Neodymium (Nd), iridium (Ir), chromium (Cr) and barium (Ba), for example. The opposite electrode 324 may be a transmissive electrode. The pixel electrode 321, the emission layer 323, and the opposite electrode 324 may form or collectively define the light emitting element EL.

The pixel electrode 321, the pixel defining layer 322, the emission layer 323, and the opposite electrode 324 may form or collectively define the light emitting element layer 320 in FIG. 7.

The thin film encapsulation layer 330 may be disposed on the opposite electrode 324. The thin film encapsulation layer 330 may prevent impurities, moisture, or the like from flowing into the light emitting element EL from the outside. The thin film encapsulation layer 330 may include at least one inorganic encapsulation layer and at least one organic encapsulation layer. In an embodiment, the thin film encapsulation layer 330 may include a first inorganic encapsulation layer 331, a second inorganic encapsulation layer 333 disposed on the first inorganic encapsulation layer 331, and an organic encapsulation layer 332 disposed between the first inorganic encapsulation layer 331 and the second inorganic encapsulation layer 333.

Figure 9:
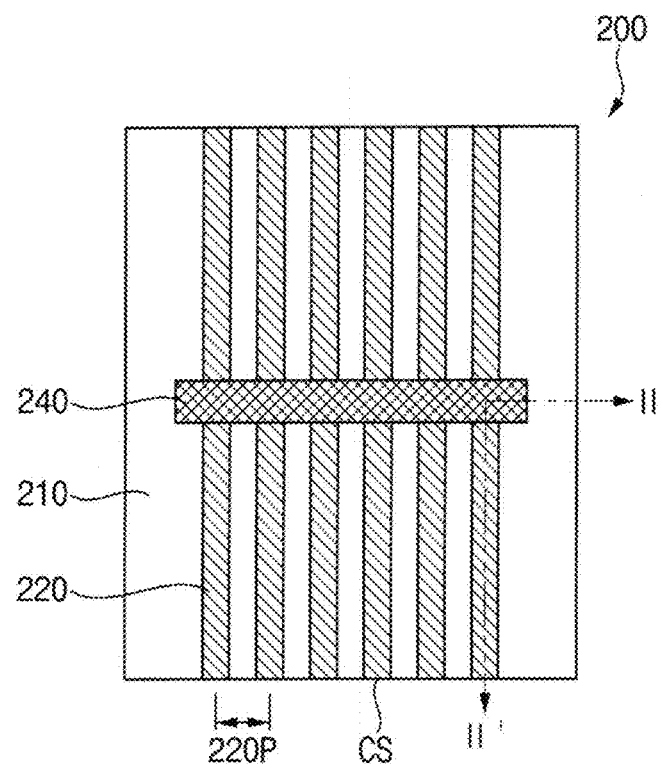
FIG. 9 is a plan view illustrating a circuit film in FIG. 6.
Figure 10:
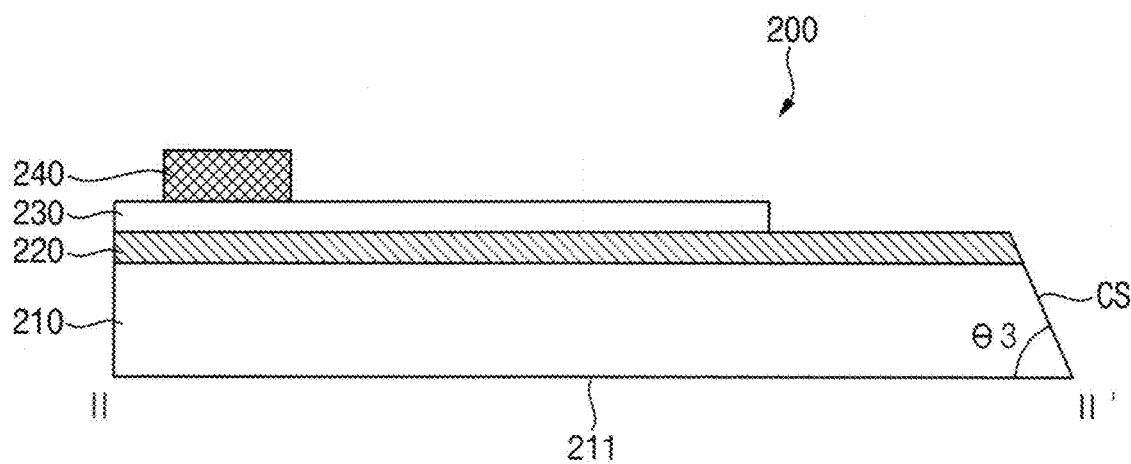
FIG. 10 is a cross-sectional view illustrating the circuit film taken along line II-II' in FIG. 9.

FIG. 9 is a plan view illustrating the circuit film 200 in FIG. 6. FIG. 10 is a cross-sectional view illustrating the circuit film 200 taken along line II-II' in FIG. 9.

Referring to FIGS. 9 and 10, an embodiment of the circuit film 200 may include a base layer 210, a plurality of leads 220, a solder resist layer 230, and a driving chip 240.

The base layer 210 may be a flexible film. For example, the base layer 210 may be a polyimide ("PI") film.

The leads 220 may be disposed on the base layer 210. The leads 220 may electrically connect the circuit film 200 to the display panel 300 in FIG. 6 and/or the printed circuit board 500 in FIG. 6. The leads 220 may include a metal such as copper (Cu), tin (Sn), nickel (Ni), gold (Au), silver (Ag), aluminum (Al), molybdenum (Mo), titanium (Ti), or the like. In one embodiment, for example, the leads 220 may include copper (Cu) and tin (Sn).

In an embodiment, a pitch 220P between the leads 220 may be about 25 µm or less. The pitch 220P may be defined as an interval between neighboring leads 220. As the display panel 300 becomes high-resolution, the circuit film 200 may include a relatively large number of leads 220, and the pitch 220P between the leads 220 may decrease such that the circuit film 200 having a limited area has a relatively large number of leads 220.

The solder resist layer 230 may be disposed on the leads 220. The solder resist layer 230 may protect the leads 220 from an outside. The solder resist layer 230 may include an insulation material such as resin or the like.

The driving chip 240 may be disposed on the solder resist layer 230. The driving chip 240 may be electrically connected to the leads 220 through contact holes defined or formed in the solder resist layer 230.

A cut surface CS may be defined in the base layer 210 and the leads 220. The circuit film 200 may be cut by the film cutting device 100 in FIG. 1 and the film cutting method described with reference to FIGS. 1 to 5, and accordingly, the cut surface CS cut by the cutter 150 in FIG. 1 of the film cutting device 100 may be defined in the base layer 210 and the leads 220. The cut surface CS may overlap the display panel 300 and/or the printed circuit board 500 in a plan view.

In an embodiment, the cut surface CS may be inclined with respect to a lower surface 211 of the base layer 210. In such an embodiment, the cut surface CS may not be perpendicular to the lower surface 211 of the base layer 210. In an embodiment, an angle θ3 formed between the cut surface CS and the lower surface 211 of the base layer 210 may be in a range of about 64.5 degrees to about 68.2 degrees.

In an embodiment, as described with reference to FIGS. 4 and 5, where the angle θ1 formed between the first surface S1 and the second surface S2 of the blade portion 154 of the cutter 150_1 having the single-edged structure is about 25 degrees or where the angle θ2 formed between the first surface S1 and the second surface S2 of the blade portion 154 of the cutter 150_2 having the double-edged structure is about 50 degrees, the circuit film 200 cut by the blade portion 154 may have a cross-sectional shape corresponding to a cross-sectional shape of the blade portion 154, and accordingly, the angle θ3 formed between the cut surface CS and the lower surface 211 of the base layer 210 may be in a range of about 64.5 degrees to about 68.2 degrees.

Figure 11:
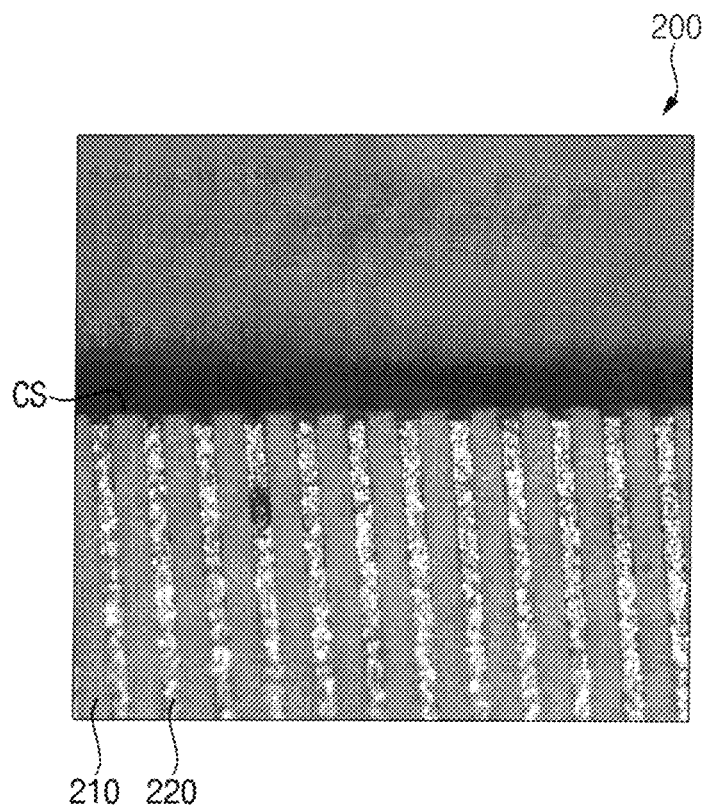
FIGS. 11 and 12 are images illustrating a circuit film according to an embodiment.
Figure 12:
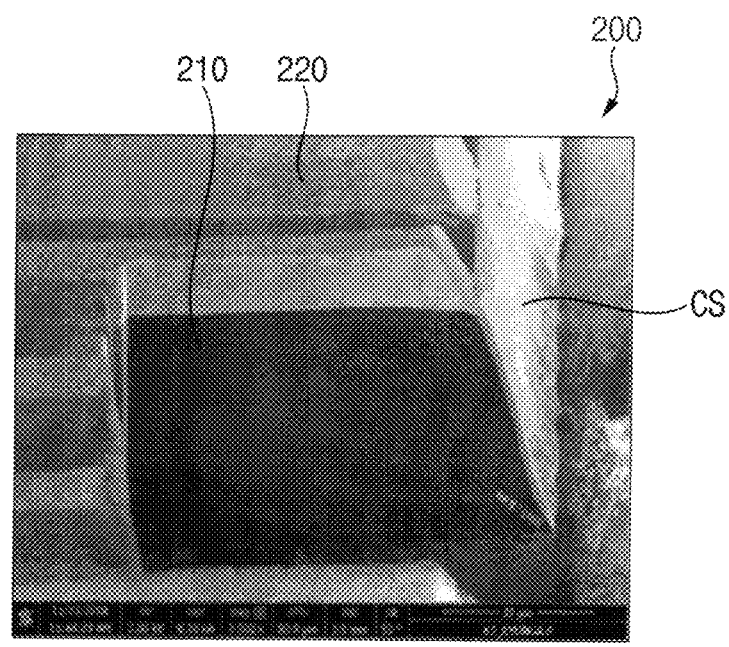

FIGS. 11 and 12 are images illustrating a circuit film 200 according to an embodiment. Particularly, FIG. 11 may illustrate an image captured from above the circuit film 200 cut by the film cutting device 100 according to an embodiment, and FIG. 12 may illustrate a scanning electron microscope ("SEM") image of the circuit film 200 cut by the film cutting device 100 according to an embodiment.

Referring to FIGS. 11 and 12, no metallic foreign material may remain between the leads 220 of the circuit film 200 cut by an embodiment of the film cutting device 100 according to the invention, and the leads 220 may not be bent. Further, the cut surface CS of the circuit film 200 may be inclined with respect to the lower surface of the base layer 210, and the angle formed between the cut surface CS and the lower surface of the base layer 210 may be in a range of about 64.5 degrees to about 68.2 degrees.

In cutting a circuit film according to the prior art, a conventional film cutting device may include a die and a punch arranged to correspond to each other, and the film cutting device may cut a circuit film according to relative movements of the die and the punch. However, when the circuit film is cut multiple times, an interval between the die and the punch may change, and accordingly, leads of the circuit film may be bent, or metallic foreign material generated by the bent leads may remain between the leads so that a short-circuit failure may occur between the leads.

In cutting the circuit film 200 according to an embodiment of the invention, the film cutting device 100 may cut the circuit film 200 while the cutter 150 vibrates in a vertical direction based on ultrasonic wave. Accordingly, metallic foreign material may not remain between the leads 220 of the circuit film 200 cut by the film cutting device 100, and the leads 220 may not be bent. In such an embodiment, the cooler 160 may cool the cutter 150 to decrease heat generated in the cutter 150, so that lifespan of the cutter 150 may increase.

Embodiments of the film cutting device may be applied for cutting a circuit film of a display device included in a computer, a notebook, a mobile phone, a smartphone, a smart pad, a portable media player ("PMP"), a personal digital assistant ("PDA"), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A film cutting device, comprising:
   a stage which supports a circuit film on an upper surface thereof;
   a cutter disposed on the stage to cut the circuit film on the upper surface of the stage;
   a vibration horn connected to the cutter, wherein the vibration horn vibrates the cutter in a first direction based on an ultrasonic wave, wherein the first direction is perpendicular to the upper surface of the stage;
   a cooler which cools the cutter;
   a vibration generator which generates the ultrasonic wave vibrating in a fourth direction crossing the first direction; and
   a converter which converts a vibration direction of the ultrasonic wave generated by the vibration generator into the first direction, wherein the cutter includes:
- a body portion connected to the vibration horn and extending in the first direction; and
- a blade portion connected to the body portion and including a first surface and a second surface, which are connected to each other at a cutting edge of the blade portion, wherein an angle between the second surface of the blade portion and the first direction is in a range of about 20 degrees to about 30 degrees such that an angle between a cut surface of the circuit film on the stage, which is cut by the blade portion in the first direction, and the upper surface of the stage is in a range of about 64.5 degrees to about 68.2 degrees, wherein the cooler is spaced apart from the cutter and the vibration horn in a fourth direction crossing the first direction, and provides cooled air toward the cutter in the fourth direction, and wherein the stage includes a heater only in a partial portion thereof which overlaps the blade portion in the first direction.

2. The film cutting device of claim 1, wherein the first surface extends in the first direction.

3. The film cutting device of claim 1, wherein
an angle between the first surface and the first direction is in the range of about 20 degrees to about 30 degrees.

4. The film cutting device of claim 3, wherein
the first surface extends in a second direction different from the first direction, wherein the second surface extends in a third direction different from the first direction and the second direction, and wherein the second direction and the third direction are symmetrical with respect to an imaginary line in the first direction.

5. The film cutting device of claim 1, wherein the cooler includes at least one selected from liquid nitrogen, liquid oxygen, liquid argon, liquid hydrogen, and liquid helium as a refrigerant.

6. The film cutting device of claim 1, wherein a frequency of the ultrasonic wave is in a range of about 20 kHz to about 40 kHz.

7. The film cutting device of claim 1, wherein a temperature of the heater is less than 100 degrees Celsius.

8. The film cutting device of claim 1, further comprising:
an amplifier connected to the vibration horn, wherein the amplifier increases an amplitude of the ultrasonic wave.

9. The film cutting device of claim 8, wherein the amplitude of the ultrasonic wave amplified by the amplifier is in a range of about 5 μm to about 15 μm.

* * * * *